United States Patent
Nguyen et al.

(10) Patent No.: US 11,454,706 B2
(45) Date of Patent: Sep. 27, 2022

(54) OPTICAL EMISSION DEVICE FOR LASER PULSES WITH SELECTIVE OPTICAL SYSTEM

(71) Applicant: Valeo Schalter und Sensoren GmbH, Bietigheim-Bissingen (DE)

(72) Inventors: Ho Hoai Duc Nguyen, Bietigheim-Bissingen (DE); Lin Lin, Bietigheim-Bissingen (DE); Peter Horvath, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 580 days.

(21) Appl. No.: 16/492,788

(22) PCT Filed: Mar. 12, 2018

(86) PCT No.: PCT/EP2018/056048
§ 371 (c)(1),
(2) Date: Sep. 10, 2019

(87) PCT Pub. No.: WO2018/166960
PCT Pub. Date: Sep. 20, 2018

(65) Prior Publication Data
US 2020/0072948 A1 Mar. 5, 2020

(30) Foreign Application Priority Data
Mar. 13, 2017 (DE) .................. 10 2017 105 210.0

(51) Int. Cl.
*G01S 17/10* (2020.01)
*G01S 7/481* (2006.01)
*G01S 17/931* (2020.01)

(52) U.S. Cl.
CPC .......... *G01S 7/4814* (2013.01); *G01S 7/4817* (2013.01); *G01S 17/10* (2013.01); *G01S 17/931* (2020.01)

(58) Field of Classification Search
CPC ...... G01S 7/4814; G01S 7/4817; G01S 17/10; G01S 17/931; G01S 17/42
See application file for complete search history.

(56) References Cited

U.S. PATENT DOCUMENTS 9,121,555 B2 * 9/2015 Hwang ................. H01L 33/60
2008/0285010 A1 11/2008 Shoji et al.
(Continued)

FOREIGN PATENT DOCUMENTS

DE 102005007945 A1 8/2006
DE 102005045302 A1 3/2007
(Continued)

OTHER PUBLICATIONS

International Search Report and Written Opinion in corresponding International Application No. PCT/EP2018/056048, dated Jun. 14, 2018 (15 pages).
German Search Report in corresponding German Application No. 10 2017 105 210.0, dated Jan. 12, 2018 (8 pages).

*Primary Examiner* — Jonathan M Hansen
(74) *Attorney, Agent, or Firm* — Osha Bergman Watanabe & Burton LLP

(57) ABSTRACT

The invention relates to an optical emission device (1) for laser pulses (28), in particular for use in a Lidar for use in a vehicle, having a laser unit (10) designed to emit laser pulses (28), and a deflection unit (11), which is arranged in the beam path of the laser pulses (28) emitted by the laser unit (10) and deflects the laser pulses (28) emitted by the laser unit (10) in a deflection region (12), wherein the optical emission device (1) has an optical system (14) arranged in the beam path of the laser pulses (28) emitted by the laser
(Continued)

unit (10) downstream of the deflection unit (11) in the deflection region (12) thereof; the optical system (14) has at least one first region (16) and at least one second region (18); and the at least one second region (18) has a lens shape for refracting the laser pulses (28). Laser scanner having an optical emission device (1) according to any one of the preceding claims and a sensor unit for receiving a reflection of the emitted laser pulse (28). The invention also relates to a laser scanner having such an optical emission device (1) and a sensor unit for receiving a reflection of emitted laser pulses (28).

15 Claims, 1 Drawing Sheet

(56) References Cited

U.S. PATENT DOCUMENTS

2016/0076732 A1* 3/2016 Kim .................. F21V 5/046
362/327
2020/0200356 A1* 6/2020 Potter .................. F21S 43/26

FOREIGN PATENT DOCUMENTS

| DE | 102012109183 A1 | 3/2014 |
| DE | 102012025281 A1 | 6/2014 |
| WO | 03/027752 A1 | 4/2003 |
| WO | 2011/026452 A1 | 3/2011 |
| WO | 2012/034881 A1 | 3/2012 |

* cited by examiner

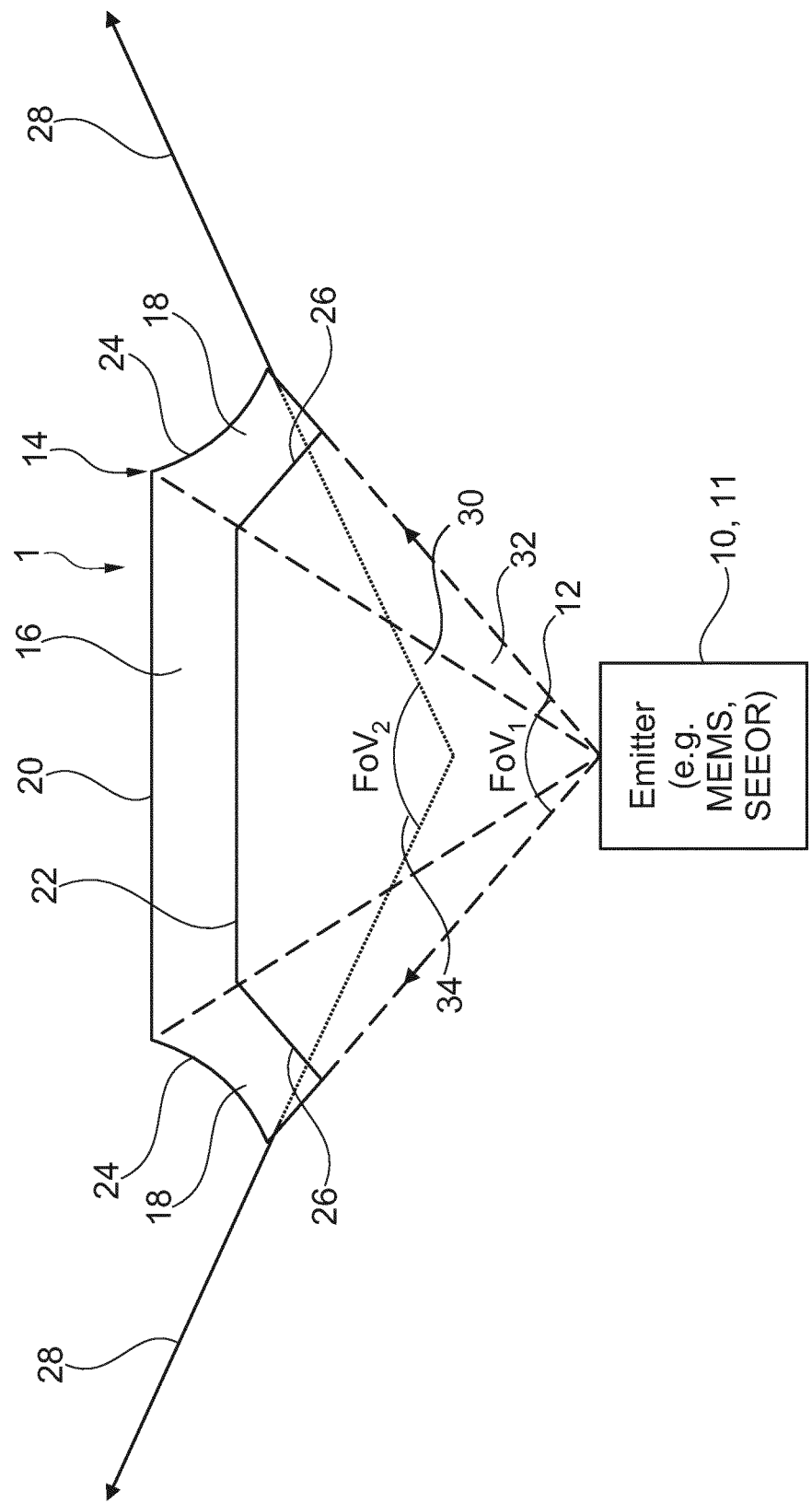

OPTICAL EMISSION DEVICE FOR LASER PULSES WITH SELECTIVE OPTICAL SYSTEM

The present invention relates to an optical emission device for laser pulses, in particular for use in a Lidar for use in a vehicle, having a laser unit designed to emit laser pulses, and a deflection unit, which is arranged in the beam path of the laser pulses emitted by the laser unit and deflects the laser pulses emitted by the laser unit in a deflection region.

The present invention also relates to a laser scanner having such an optical emission device for laser pulses and a sensor unit for receiving a reflection of the emitted laser pulse.

The present invention also relates to a driver assistance system having such an optical emission device for laser pulses.

The present invention furthermore relates to a vehicle having such a laser scanner.

The present invention furthermore relates to a vehicle having such a driver assistance system.

In current vehicles, environmental sensors are used to measure the distance, position and/or contours of surrounding objects. LiDAR-based systems such as laser scanners are increasingly used for this, for example. The term LiDAR stands for "Light detection and ranging". Laser scanners form a sub-group of LiDAR-based systems which sense their environment in the manner of a grid with individual, spaced-apart measurement points.

The LiDAR-based systems such as, for example, laser scanners can sense environmental information as reflections of emitted laser pulses, a deflection unit deflecting the laser pulses in order to be able to sense the largest possible deflection region with the laser scanner.

Each of these LiDAR-based systems thus has a sensing angle region, also referred to as a "field of view" (FoV), which is substantially defined by the deflection region. The sensing angle region is a limited region within which the environmental information can be sensed. In addition to distance information at individual measurement points which results from the time of flight of an emitted laser pulse until the reception of the reflection thereof by an object, modern LiDAR-based systems can also sense the intensities of the reflections in order to thereby obtain additional information about the surrounding objects. The information can be combined so that individual distance measurements can also be assigned measured values for the intensity of the reflection in each case.

With laser scanners, for example, it is known to divide the sensing angle region thereof into sub-sectors in the horizontal region and, for each of the sub-sectors, to determine the distance values of objects located within the sub-sector in question at a defined scanning rate. The sub-sectors can for example be processed successively. Alternatively, the laser scanners can scan the entire sensing angle region thereof continuously.

Fields of application, performance and reliability of devices and methods in which the measurement data of such LiDAR-based systems are used depend inter alia on the size of the horizontal sensing angle region of the LiDAR-based systems and on an angular resolution for adjacent measurement points within the sensing angle region. Current laser scanners achieve for example a horizontal sensing angle of approximately 100° and an angular resolution of approximately 0.1°. This applies in particular to laser scanners with non-mechanical deflection devices. Laser scanners with mechanical deflection devices can certainly partially cover a relatively large sensing angle region. However, such mechanical deflection devices are relatively slow and unsuitable or only suitable to a limited extent for many requirements in current vehicles and driver assistance systems. Approaches with a combination of two adjacent laser scanners which together cover a larger sensing angle region are certainly also known. However, this doubles the costs in comparison with the use of a single laser scanner and often entails problems owing to overlapping regions and/or regions which are not sensed, in particular in the border region of the sensing angle regions of the two laser scanners.

In this connection, DE 10 2005 045 302 A1 discloses a method for operating a distance sensor for detecting the surroundings of a motor vehicle, in which sub-sectors within a sensing angle region of the distance sensor are specified, for which distance values to objects in the environment of the motor vehicle are determined sequentially by the distance sensor, and a measurement parameter of the distance sensor, which correlates with the range of the distance sensor, is varied among the sub-sectors. With a distance sensor, in particular for use in such a method, by means of which distance values to objects in the environment of the motor vehicle can be determined sequentially for multiple sub-sectors within a sensing angle region, a measurement parameter of the distance sensor, which correlates with the range of the distance sensor, can be varied among the sub-sectors.

Proceeding from the aforementioned prior art, the invention thus addresses the problem of specifying an optical emission device of the aforementioned type, a laser scanner having such an optical emission device, a driver assistance system having such a laser scanner, a vehicle having such a laser scanner, and a vehicle having such a driver assistance system which are cost-effective to produce and simple to use, cover a large sensing angle region and have a high resolution in relevant regions.

The problem is solved according to the invention by the features of the independent claims. Advantageous embodiments of the invention are specified in the dependent claims.

According to the invention, an optical emission device for laser pulses is thus specified, in particular for use in a Lidar for use in a vehicle, having a laser unit designed to emit laser pulses, and a deflection unit, which is arranged in the beam path of the laser pulses emitted by the laser unit and deflects the laser pulses emitted by the laser unit in a deflection region, wherein the optical emission device has an optical system arranged in the beam path of the laser pulses emitted by the laser unit downstream of the deflection unit in the deflection region thereof, wherein the optical system has at least one first region and at least one second region, wherein the at least one second region has a lens shape for refracting the laser pulses.

According to the invention, a laser scanner having such an optical emission device and a sensor unit for receiving a reflection of the emitted laser pulse is also specified.

According to the invention, a driver assistance system having such a laser scanner is also specified.

According to the invention, a vehicle having such a laser scanner is also specified.

According to the invention, a vehicle having such a driver assistance system is additionally specified.

The concept of the present invention is therefore to use the optical system to effect a selective change, i.e. widening or narrowing, in the deflection region, also referred to below as sensing angle region or field of view, of the optical emission device in the at least one second region. Since the deflection region also corresponds to the angle region in which reflections of the emitted laser pulse are received by the sensor unit of the laser scanner, the terms deflection region and sensing angle region can be used substantially synonymously, even though the sensing of the reflections of the laser pulses is independent of the optical emission device. As a result, on the one hand the sensing angle region of the optical emission device is changed overall, and on the other hand first and second regions can be sensed simultaneously with different levels of precision. Therefore, for example, a sensing angle region of well over 100°, which the optical emission device or laser scanner without an optical system typically has, for example 140° or more, can be achieved with a single optical emission device or a single LiDAR or laser scanner. When the deflection region is narrowed, the deflection region overall can be made smaller. The deflection region can also remain unchanged overall if a widening by the one region and a narrowing by the other region cancel each other out, but the properties of the first and second regions can be selected to be different. Therefore, it is no longer necessary to use two adjacent LiDARs or laser scanners for intended uses such as covering a side of the vehicle, for example. However, the at least one second region means that an angular resolution achieved by the deflection unit, typically approximately 0.1°, is likewise changed in the at least one second region. However, this change is not produced for the entire deflection region. At the same time, certain regions in the sensing angle region can be sensed without the change in the at least one second region, and therefore an angular resolution of the deflection unit can be maintained or is only slightly reduced.

The design of the at least one second region with a lens shape in this case means that the at least one second region is designed in the manner of an optical lens. As a result, the laser pulses are refracted at the boundary faces of the optical system in the at least one second region, which results in the change in the deflection region. In principle, the at least one second region can have an optical lens of any design.

The at least one second region preferably has a concave lens shape. Accordingly, the at least one second region is designed in the manner of a diffusing lens. Accordingly, a selective widening of the deflection region in the at least one second region takes place owing to the optical system. As a result, the sensing angle region of the optical emission device is enlarged, and on the other hand first and second regions can be sensed simultaneously with different levels of precision. Therefore, for example, a sensing angle region of well over 100°, which the optical emission device or laser scanner without the optical system typically has, for example 140° or more, can be achieved with a single optical emission device or a single LiDAR or laser scanner. Therefore, it is no longer necessary to use two adjacent laser scanners for intended uses such as covering a side of the vehicle, for example. The at least one second region means that an angular resolution achieved by the deflection unit, typically approximately 0.1°, is likewise changed in the at least one second region but not necessarily in the at least one first region. Therefore, certain regions in the sensing angle region which are defined by the at least one first region can be sensed without changing the angular resolution in the at least one second region, and therefore an angular resolution of the deflection unit can be maintained or is only slightly reduced.

The at least one second region can therefore be of biconcave, plano-concave or convex-concave design, for example. The concave shape of the at least one second region therefore differs from the design of the at least one first region in order to achieve the selective widening of the deflection region.

In an advantageous embodiment of the invention, the first region has a lens shape for refracting the laser pulses, the lens shape of the at least one first region differing from the lens shape of the at least one second region. The optical system thus effects a change in the emission of the laser pulses over the entire sensing angle region of the optical emission device but which change is selectively different in the first and second regions. The corresponding situation applies to the angular resolution of the optical emission device. The lens shape of the first and second regions can in principle be the same, for example both regions can be designed as concave regions having a different curvature or focal length. Alternatively, the lens shape of the first and second regions can be different, i.e. convex or concave.

In an advantageous embodiment of the invention, the lens shape of the at least one first region and of the at least one second region in each case has a concave shape, the lens shape of the at least one first region having a lesser curvature than the lens shape of the at least one second region. The shape of the at least one first region is thus less pronounced than that of the at least one second region, and therefore the sensing angle region is widened less in the first region than in the second region. Alternatively, the at least one first region can be designed such that the laser pulses pass through substantially without deflection. The at least one first region can for example be designed with two parallel surfaces, for example in the manner of a glass pane with two parallel outer faces.

In principle, it can also be possible for the at least one first region and/or a third region to have a convex shape, so that here the angular resolution can be improved over an original angular resolution of the optical emission device. This can be done depending on an intended use of the optical emission device or LiDAR or laser scanner.

Furthermore, the optical system can have one or more further regions which have a lens shape, in particular concave lens shape, having a different curvature from the at least one second region. In principle, one of the further regions can also have a convex shape.

In an advantageous embodiment of the invention, the at least one first region forms a central region of the optical system, and the at least one second region forms an edge region of the optical system. It is not necessary in this case for the edge region to surround the central region completely. Here, individual segments can also be formed from multiple second regions. A change in the sensing angle region and an associated change in the angular resolution takes place in the edge region owing to the lens shape of the at least one second region. For example, a widening of the sensing angle region and an associated reduction in the angular resolution can take place in the edge region owing to the lens shape of the at least one second region. In the central region, which often contains particularly relevant information, the widening therefore does not take place, and the environment can be sensed at a higher angular resolution.

In an advantageous embodiment of the invention, the optical system has a first region and two second regions, the two second regions adjoining the central region of the optical system on opposite sides. When used for "seeing", a distinction is often made between a horizontal and a vertical design of the sensing angle region. This is because, inter alia, relevant objects are typically situated at the same or a similar height. The sensing angle region can thus be enlarged particularly in the horizontal direction so as to be able to sense a particularly large amount of relevant information in the horizontal direction.

In an advantageous embodiment of the invention, the at least one first region is in the form of a support for the at least one second region. The at least one second region is thus held on the at least one first region. Nevertheless, the optical system is usually held at the edge region thereof, which often corresponds to at least one of the second regions.

In an advantageous embodiment of the invention, the at least one first region is in the form of a curved film. The curved film is designed to allow laser pulses to pass through without widening of the sensing angle region. The curved film improves the performance of the laser scanner.

In an advantageous embodiment of the invention, the at least one first region and the at least one second region form a continuous transition. This ensures that the optical emission device can cover the entire sensing angle region completely on the one hand and without overlaps on the other hand.

In an advantageous embodiment of the invention, the at least one second region is designed to enlarge the deflection region for laser pulses deflected by the deflection unit. Preferably, the at least one second region is designed to enlarge the deflection region for laser pulses deflected by the deflection unit by a factor of 1.5 to 4, particularly preferably by a factor of 2 to 3. With corresponding widening and given a corresponding size of the at least one second region, good coverage can be achieved, with the angular resolution being sufficient for most tasks.

In an advantageous embodiment of the invention, the at least one first region has a first angle region for laser pulses deflected by the deflection unit of 40° to 100°, preferably of 50° to 80°, particularly preferably of approximately 60°. With this first angle region of the at least one first region, for example, a sufficiently large first region can be formed to be able during driving with the vehicle to cover an immediate hazard region, for example in the driving direction, with a high degree of precision using the optical emission device or the Lidar or laser scanner.

In an advantageous embodiment of the invention, the optical system is manufactured from a glass or plastic which is transparent to laser pulses of the laser unit. Such materials can be provided with different refractive indices to achieve suitable refraction of the laser pulses at their boundary faces. Plastic is usually distinguished by a lower weight than glass in this case.

In an advantageous embodiment of the invention, the deflection unit is in the form of a non-mechanical deflection means. There are different types of non-mechanical deflection means, which are usually distinguished by a higher speed of deflection than purely mechanical deflection means and thus allow fast laser scanners to be provided.

Non-mechanical deflection means include for example micro-scanners or micro-scanning mirrors. With micro-scanners, the deflection is typically produced via a single mirror. A further non-mechanical deflection means relates to a "scannable electro-evanescent optical refractor" (SEEOR), which can comprise liquid crystal technology, for example.

The invention is explained in more detail below with reference to the attached drawing using preferred embodiments. The features shown can represent an aspect of the invention both alone and in combination in each case. Features of different exemplary embodiments can be transferred from one exemplary embodiment to another.

In the FIGURE,

FIG. 1 shows a schematic sectional view of an optical emission device of a laser scanner for a driver assistance system of a vehicle according to a first, preferred embodiment, having a laser unit, a deflection unit and an optical system.

FIG. 1 shows an optical emission device 1 according to a first, preferred embodiment. The optical emission device 1 is part of a laser scanner for a driver assistance system of a vehicle.

The optical emission device 1 comprises a laser unit 10 which emits a laser pulse 28. The optical emission device 1 further comprises a deflection unit 11 which deflects the emitted laser pulse 28 in a deflection region 12. The deflection region 12 is also referred to as field of view (FoV) and corresponds to a sensing angle region which can be covered with emitted laser pulses 28 by the optical emission device 1. In this exemplary embodiment, the laser unit 10 is formed integrally with the deflection unit 11. In this exemplary embodiment, the deflection unit 11 produces a deflection region 12 of approximately 100° with an angular resolution of approximately 0.1°. The deflection unit 11 is in the form of a non-mechanical deflection means 11. In this exemplary embodiment, the deflection unit 11 is in the form of a micro-scanner or micro-scanning mirror or MEMS. In an alternative embodiment, the deflection unit 11 is designed with a "scannable electro-evanescent optical refractor" (SEEOR), which in this case comprises liquid crystal technology.

The optical emission device 1 also has an optical system 14, which is arranged in the deflection region 12 of the deflection unit 11. The optical system 14 is manufactured from a glass or plastic which is transparent to laser pulses 28 of the laser unit 10. The optical system 14 has a first region 16 and two second regions 18, the two second regions 18 adjoining the first region 16 of the optical system 14 on opposite sides. The first region 16 and the two second regions 18 have a continuous transition in this case. The first region 16 forms a central region of the optical system 14, and the two second regions 18 form two edge regions in the horizontal direction.

The first region 16 is designed with a flat outer face 20, which is arranged on a side of the optical system 14 facing away from the deflection unit 11, and with a flat inner face 22, which is arranged on a side of the optical system 14 facing the deflection unit 11, so that laser pulses 28 can pass through the first region 16 substantially without deflection or refraction. The first region 16 comprises a first angle region 30 for laser pulses 28 emitted by the deflection unit 11 of approximately 60°.

The two second regions 18 have a concave lens shape for deflecting or refracting the emitted laser pulse 28. Accordingly, the two second regions 18 are each designed in the manner of a diffusing lens. In this exemplary embodiment, the two second regions 18 are of plano-concave design with a concave outer face 24 and a flat inner face 26. Each of the two second regions 18 comprises a second angle region 32 for laser pulses 28 emitted by the deflection unit 11 of approximately 20°. The curvature of the outer face 24 of the second regions 18 is designed to be such that the deflection region 12 for laser pulses 28 emitted by the deflection unit 11 is enlarged by a factor of approximately 2.25. Accordingly, each of the two second angle regions 32 is widened from approximately 20° to 45°.

With the first region 16 and the two second regions 18, a coverage region 34 with an angle of approximately 150° in total is produced for the optical system 14. The coverage region 34 of the optical system 14 is therefore greater than the deflection region 12 of the deflection unit 11. The first region 16 is sensed with the angular resolution of the deflection unit 11 in this case, whereas the angular resolution is reduced in the two second regions 18, specifically in correspondence with the enlargement in the second regions 18.

In this embodiment, the first region 16 acts as a support for the two second regions 18, the two second regions 18 being held on the first region 16. The optical system 14 as a whole is held at the edge region thereof.

In an alternative embodiment, the first region 16 is in the form of a curved film which allows emitted laser pulses 28 to pass through without widening of the deflection region 12.

In addition to the described optical emission device 1, the laser scanner comprises a receiver unit (not shown here) for receiving a reflection of the emitted laser pulses 28. In an alternative embodiment, the laser scanner is designed to receive the reflection of the emitted laser pulses 28 as well through the optical system 14.

| List of reference symbols | |
|---|---|
| Optical emission device | 1 |
| Laser unit | 10 |
| Deflection unit | 11 |
| Deflection region (deflection unit) | 12 |
| Optical system | 14 |
| First region | 16 |
| Second region | 18 |
| Outer face (first region) | 20 |
| Inner face (first region) | 22 |
| Outer face (second region) | 24 |
| Inner face (second region) | 26 |
| Laser pulse, laser beam | 28 |
| First angle region | 30 |
| Second angle region | 32 |
| Coverage region (optical system) | 34 |

The invention claimed is:

1. An optical emission device for laser pulses for use in a Lidar for use in a vehicle, comprising:
   a laser unit configured to emit laser pulses; and
   a deflection unit, which is arranged in the beam path of the laser pulses emitted by the laser unit and deflects the laser pulses emitted by the laser unit in a deflection region,
   wherein the optical emission device has an optical system arranged in the beam path of the laser pulses emitted by the laser unit downstream of the deflection unit in the deflection region thereof,
   wherein the optical system has at least one first region and at least one second region, the at least one second region comprising a lens shape for refracting the laser pulses.

2. The optical emission device according to claim 1, wherein the at least one the first region has a lens shape for refracting the laser pulses, wherein the lens shape of the at least one first region differs from the lens shape of the at least one second region.

3. The optical emission device according to claim 2, wherein the lens shape of the at least one first region and of the at least one second region in each case has a concave shape, wherein the lens shape of the at least one first region has a lesser curvature than the lens shape of the at least one second region.

4. The optical emission device according to claim 1, wherein the at least one first region forms a central region of the optical system, and the at least one second region forms an edge region of the optical system.

5. The optical emission device according to claim 4, wherein the optical system has a first region and two second regions, wherein the two second regions adjoin the central region of the optical system on opposite sides.

6. The optical emission device according to claim 1, wherein the at least one first region is in the form of a support for the at least one second region.

7. The optical emission device according to claim 1, wherein the at least one first region is in the form of a curved film.

8. The optical emission device according to claim 1, wherein the at least one first region and the at least one second region form a continuous transition.

9. The optical emission device according to claim 1, wherein the at least one second region is configured to enlarge the deflection region for laser pulses deflected by the deflection unit.

10. The optical emission device according to claim 1, wherein the at least one first region has a first angle region for laser pulses deflected by the deflection unit of of approximately 60°.

11. The optical emission device according to claim 1, wherein the optical system is manufactured from a glass or plastic which is transparent to laser pulses of the laser unit.

12. A laser scanner having an optical emission device according to claim 1; and a sensor unit for receiving a reflection of emitted laser pulses.

13. A driver assistance system having a laser scanner according to claim 12.

14. A vehicle having a laser scanner according to claim 12.

15. A vehicle having a driver assistance system according to claim 13.

* * * * *